July 16, 1963     S. GUARNASCHELLI     3,098,115
ELECTRICAL DISTRIBUTION SYSTEM
Filed April 7, 1960     2 Sheets-Sheet 1
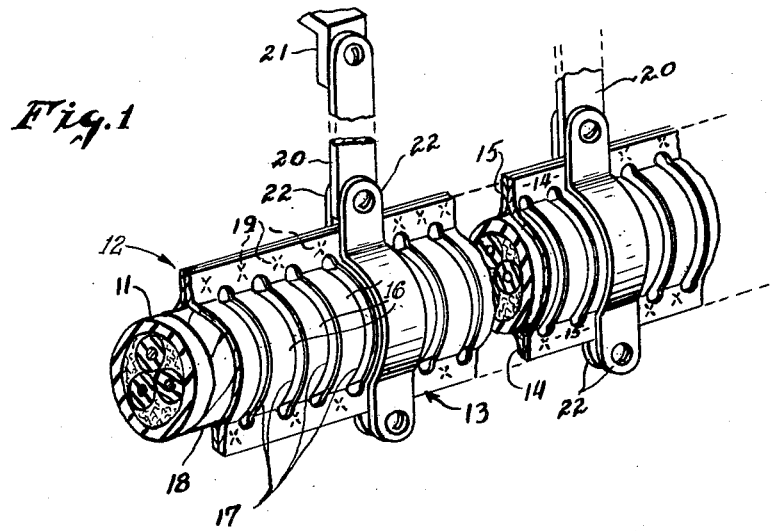
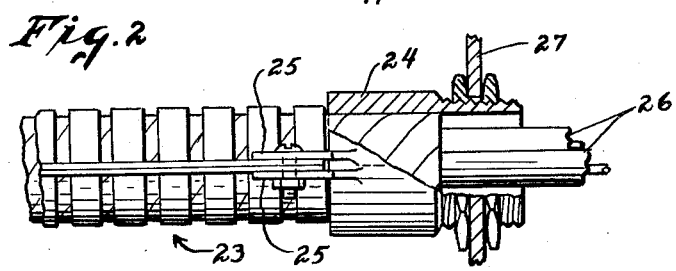
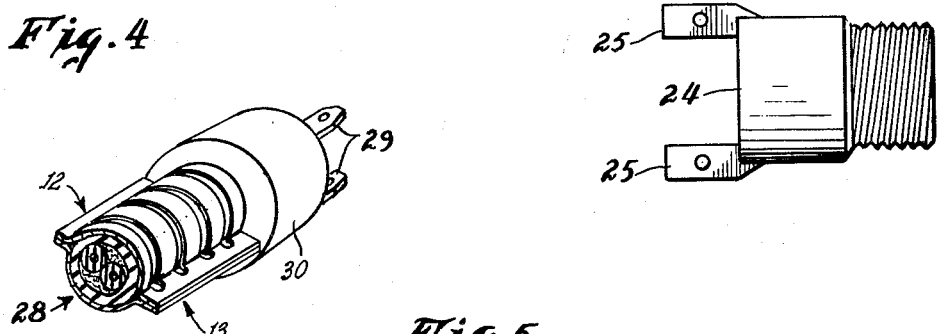
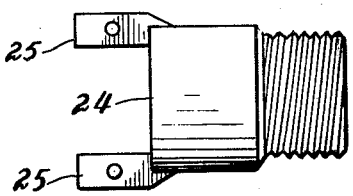
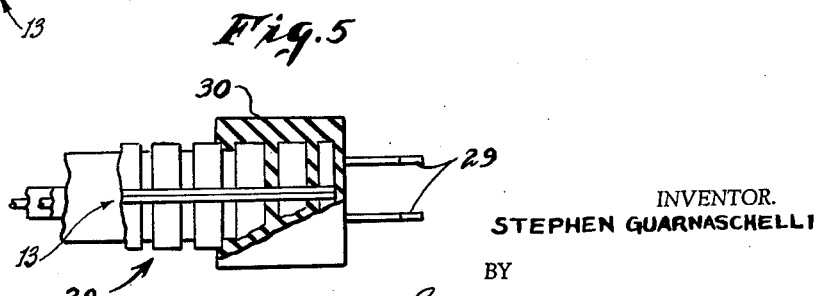
INVENTOR.
STEPHEN GUARNASCHELLI
BY
ATTORNEYS

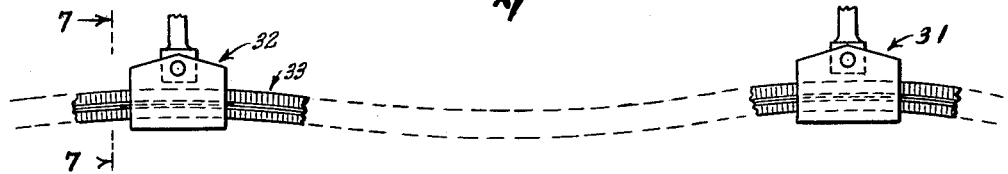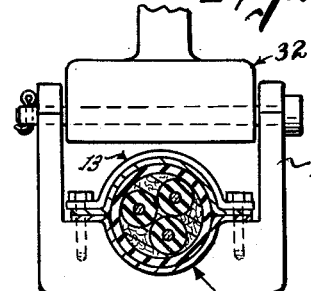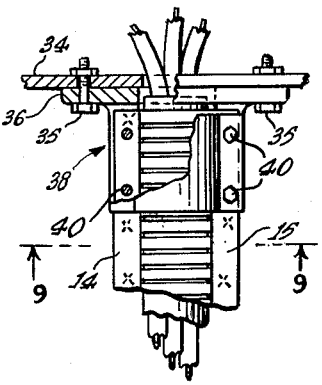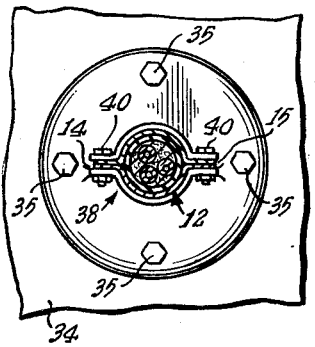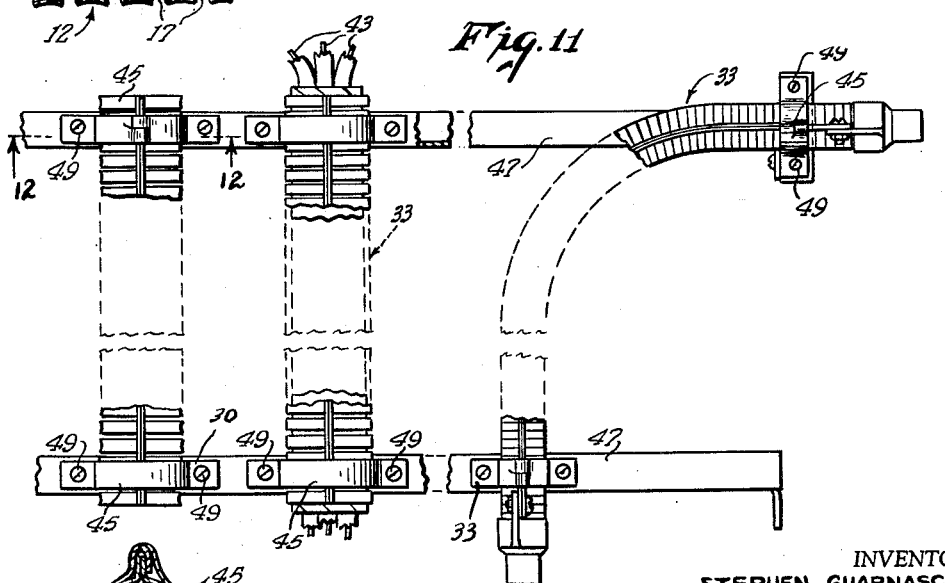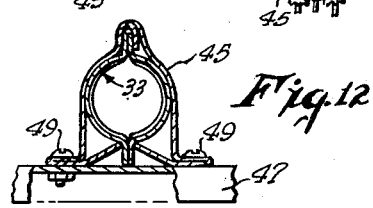

United States Patent Office 3,098,115
Patented July 16, 1963

3,098,115
ELECTRICAL DISTRIBUTION SYSTEM
Stephen Guarnaschelli, Garden City, N.Y., assignor, by mesne assignments, to Atlas Corporation, a corporation of Delaware
Filed Apr. 7, 1960, Ser. No. 20,623
3 Claims. (Cl. 174—102)

This invention relates to armored insulated electric conductors and more particularly to armored cables adapted for use in a variety of types of installations, and to the armor through which electric conductors can be pulled after installing the armor. These cables, which may be either single conductor or multiple conductor, are peculiarly adapted to use in installations, both indoors and out, where the cable will be suspended in the air by means of hangers from a ceiling, beam, or messenger, which hangers support the cable at spaced intervals along its length. These intervals may vary from a matter of inches up to several feet, depending on the size and physical characteristics of the cable, the course of the cable in the installation, surrounding conditions, and other factors.

At the present time cables having interlocked helically wound metal armor are laid in troughs, trays, or racks, or are suspended from messenger cables, or are pulled into ducts. These cables have substantially universal flexibility, i.e. similar ability to bend in all directions. Consequently it is necessary on horizontal and sloping lines to support these cables substantially continuously throughout their length, as by use of the aforementioned troughs, trays and ducts, or at very short intervals, as by closely spaced rings or bindings when suspended from messenger cables.

It is an object of the present invention to provide improved armored cable constructions. It also is an object of the invention to provide armored cables which may be suspended in horizontal and sloping lines without necessity for the use of troughs, trays, ducts, or the like. It is another object of the invention to provide cables having flexibility substantially limited to a single plane. It is still another object of the invention to provide armored cables which, in horizontal and sloping installations, do not require continuous support, or suspensions at short intervals. Another object of the invention is to provide an armored cable which may be trained and installed with minimum space requirements. Still another object of the invention is to provide cables which, when installed, have a neat clean appearance, and which are easy to reach for servicing. Still another object of the invention is to provide an armored cable construction which makes possible economies in original cost, installation and servicing. It is also an object of the invention to provide a conduit or duct of limited flexibility through which an electric cable may be pulled or drawn. Still another object of the invention is to so shape the armor that the passage of a fishing wire therethrough or the pulling of a cable therethrough will be facilitated. Other objects and advantages of the invention will become apparent, or will be pointed out, as the description proceeds.

Typical embodiments of the invention selected for purposes of illustration and description are shown in the accompanying drawings, in which:

FIGURE 1 is a fragmentary perspective view of an installation showing armored cable and one type of hanger suitable for use for supporting the cable of this invention;

FIGURE 2 is a fragmentary view of an installation showing how cable of this invention may be easily terminated in a box;

FIGURE 3 is another view of the terminal member shown in FIGURE 2;

FIGURE 4 is a fragmentary perspective view of a cable having a different type of end termination;

FIGURE 5 is another view of the construction shown in FIGURE 4, a portion of the end fitting being broken away to disclose the construction more clearly;

FIGURE 6 shows cable ducts arranged between supports with the flanges of the armor in a horizontal plane to permit the armored cable to assume catenary position;

FIGURE 7 is a cross section on the line 7—7 of FIGURE 6 and showing a support that permits the cable to take the catenary curve between supports;

FIGURE 8 is an elevation partly in section of a terminal end of the armor with three conductors protruding therefrom;

FIGURE 9 is a cross section on the line 9—9 of FIGURE 8;

FIGURE 10 is a detail of the armor in a preferred form;

FIGURE 11 illustrates three typical structures for the terminal ends of the armor prior to drawing in of the cable at the left and right of the figure, but having a cable drawn therein in the other view; and FIGURE 12 is a special form of a connector between the duct or cable and a frame member.

Electric cables commonly are manufactured in continuous lengths of several hundred feet for installation. Such cable must be flexible to permit it to be placed on a reel for purposes of transportation, and to permit its installation in the field. These requirements for flexibility have made it necessary, in the past, when applying metal armorings to cables at the factory to employ wires or tapes which were wrapped helically about the cable core over the insulated conductor, if single conductor cable, or over the insulated and assembled conductors, if multiple conductor cable.

According to the present invention the cable armor is made in the form of two similar metal strips which extend parallel to and encompass the conductor, these strips being secured together continuously, or at short intervals, along their opposed edges. These strips are wide, as compared to their thickness, and are relatively inflexible in the plane of the strip. As a result the flexibility of this cable is substantially limited to a single plane, but this characteristic presents no insurmountable obstacle to the handling and installation of the cable, and it has an important advantage in installation, as will appear more fully hereinafter.

In the drawings the electric cables are shown more or less schematically, because the armor of the present invention can be applied to many types of cables, including cables having metal sheaths and cables having non-metallic sheaths. The cable conductors, usually of copper or aluminum, ordinarily will be stranded, but they may be solid in some cases. The conductor insulation and the sheathing may comprise any of the materials customarily used for those purposes. Electrostatic shielding may be employed in accordance with known practices, and if the sheath of the cable over which the armor is to be applied is a non-conductor it may be desirable, depending on the voltage for which the cable is designed, and other factors, to apply a sheathing layer of conducting or semi-conducting material over the sheath before the armor is applied.

FIGURE 1 shows, merely by way of illustration, a three-conductor cable, the three conductors being individually insulated, cabled together with suitable fillers to form a round core, and then enclosed within a protective sheath 11. The cable armor comprises two similar elongated ribbon-like members 12, 13, each having substantially co-planar longitudinally extending edge portions or fins 14, 15 which are interconnected by crossbands 16, uniformly placed along the length of the edge portions.

These crossbands 16 are bowed outwardly in common direction from the plane of the edge portions substantially to semicylindrical contour, as shown in the drawing, so that each ribbonlike member 12, 13 is concave on one face and convex on the other face, intermediate its coplanar edge portions 14, 15.

The two reinforcing members are alike and conveniently may be made in long continuous lengths by a continuous operation. In making these reinforcing members a continuous metal ribbon of width somewhat greater than one-half the circumference of the cable to be armored will be passed through a punching machine. This machine punches out a series of uniformly spaced openings in the form of transverse slots 17, thus forming the crossbands 16 which connect the coplanar edge portions 14, 15 of the ribbon.

The dimensions of these openings 17 transversely of the ribbon, i.e. their length, will be equal to, or very slightly greater than, one-half the circumference of the cable. The width of the openings 17, i.e. their dimension longitudinally of the ribbon, may vary considerably depending on the size of the cable, the material from which the ribbon is made, the thickness of the ribbon, the flexibility requirements for the armored cable, and other factors. The width of the crossbands 16, i.e. their dimension longitudinally of the cable, also may vary considerably for armors for different cables. Ordinarily the width of the crossbands 16 will be equal to or greater than the width of the openings 17, and it may be as great as twice the width of the openings, or even more, without interfering with the desired flexibility of the cable, or causing damage to the cable upon being bent.

After the openings 17 have been punched, the ribbon conveniently then may be passed through a rolling or other suitable pressing machine which will bow the crossbands 16 outwardly in a common direction from the plane of the edge portions 14, 15 to the desired substantially semicylindrical contours. At the same time each crossband may be given a contour illustrated in FIGURE 10 wherein each of the crossbands is shown to be concave on the outside and convex on the inside. The ribbon-like members produced by these steps are relatively inflexible in the plane of their edge portions, but may be readily reeled for storage prior to being applied to a cable.

Two of these ribbon-like members 12, 13 are assembled on the cable 11 with their concave faces toward each other, so that the coplanar edge portions 14, 15 of the two ribbon-like members lie face to face and the cable is encircled by the crossbands of the two members. In FIGURE 1, 18 represents an electrostatic shielding layer, which may be of conventional construction. The edge portions 14, 15 of the two ribbon-like members then are secured together. Preferably this will be done by welding the edge portions together, either by spot welds 19 spaced at short intervals along the cable, or by a continuous seam weld. Preferably the width of the welds, whether spot welding or seam welding, is considerably less than the width of the edge portions and is located approximately midway of the width of the edge portions. The metal, being a good conductor of heat, acts to distribute the heat from the welding operation and by spacing the welds slightly from the cable proper it is possible to weld the two ribbon-like members together on a cable without harmful heating of the cable.

If it is desired to install the armour as a conduit or duct through which an electric conductor may be drawn, the two parts of the armor will be placed on opposite sides of the center line through the marginal reinforcement. The two parts may be brought face to face and welded along the meeting line. Again the armor used as a conduit or duct may be reeled for shipment and installed with the marginal edge portions in the desired plane which would be approximately at right angles to the plane which the conduit takes in the final assembly.

Various materials may be used for the ribbon-like members, depending on the strength, flexibility and other specification for the armored cable. Ordinarily the ribbon-like members will be metal and I have found stainless steel type 302 to be particularly suitable. This stainless steel has high tensile strength and ribbon-like members formed in the manner described hereinabove are relatively inflexible in the plane of their edge portions. Moreover, the stainless steel is relatively immune to attack by rust and corrosion.

Conveneintly the assembling of the two ribbon-like members on a cable may take place as the otherwise finished cable comes from the sheathing machine. In either case the applying of the armor constitutes merely one additional operation on the cable before it is reeled for shipment. The relatively inflexibility in one plane of the completed cable is not sufficient to interfere with reeling the cable on standard type cable reels, the cable taking a helical course about the reel drum and building up in layers thereon. There will, of course, be some increase in the spacing between turns of the cable because of the projecting edge portions.

When the cable or duct is installed in the field it will be withdrawn from the reel in the usual manner and laid out on the floor or ground, or immediately lifted into the air. The completed cable will be supported at intervals by suitable hangers, for example of the type disclosed in FIGURE 1. The inflexibility of the cable in one plane is relied on to support the cable without substantially sagging between spaced suspension points. Unless the reel is laid on its side preparatory to removing the cable this will require twisting the entire cable 90° about its longitudinal axis in order to make the plane of the edge portions of the unreeled cable vertical. When this is done it will be found that the cable suspension points may be spaced several feet apart, for example 8 to 10 feet, or more, and there will be little or no noticeable sagging of the cable between such suspension points.

FIGURE 1 discloses, merely by way of example, a simple type of suspension suitable for use with the armored cable of the present invention. A rod or strap 20 is secured at its upper end to any suitable supporting structure 21. The cable is secured to the lower end of the member 20, for example by means of simple clamp members 22 and bolts as shown in the drawing. These clamp members serve also to maintain the armored cable with the edge portions, or fins, of the ribbon-like members in a vertical plane. Two of the hangers 20 are shown in FIGURE 1, and two are shown in FIGURE 6. It will be understood that there will be a series of supports for the cable spaced along the course which the cable is to follow. Wide variation in the means employed for supporting the armored cable is possible, the only special requirement being that the supporting means be capable of preventing the cable from twisting about its longitudinal axis.

The armored cable installed as illustrated in FIGURES 1 and 6 may be expected to have flexibility in the horizontal plane not greatly different from known types of armored cables. However, this cable is relatively inflexible in a vertical direction when the edge portions of the ribbon-like members are vertical, as shown. When it is desired to shift the course of the cable in a vertical direction this can be accomplished readily. The edge portions 14, 15 of the ribbon-like members constituting the armor will be cut through at the ends of two of the slots 17. The slots selected for the cutting are spaced a short distance apart, from a few inches to a few feet depending on the size of the cable, the angle and radius of the bend to be made, and other factors. The short intermediate section of armor thus freed from the armor on both sides of the section then will be twisted about the longitudinal axis of the cable through the angle necessary to permit bending the cable to make the desired change in direction. Ordinarily the armor will not fit the sheath so tightly as to prevent this twisting movement. Even if the crossbands 16 are in surface contact with the cable sheath substantially around its circumference there will be a resiliency because the welds between the edge portions of the ribbon-like members are not immediately adjacent the cable. The adjacent ends of the armor then will be reconnected, for example by means of a longitudinally split clamp having oppositely disposed pairs of ears projecting from both ends thereof at the proper rotated angle for engagement with and connection to the edge portions of the angularly rotated armor sections.

FIGURE 2 is a fragmentary view of a cable installation showing how a cable armored according to the present invention may be terminated in a box. Telescoped onto the end of the armored cable 23 is a sleeve 24. The rear end of this sleeve is provided with oppositely disposed pairs of ears 25, i.e. they are arranged around the sleeve from each other at an angle of 180°. The ears of each pair are spaced sufficiently far apart to receive the edge portions, or fins, of the cable armor. In the assembly the ears of each pair and the edge portions therebetween may be secured together, for example by bolts as shown. This will secure the sleeve 24 firmly on the end of the cable with the insulated conductor or conductors extending outwardly through the forward end of the sleeve as shown at 26. The forward end of the sleeve 24, may be screw threaded, as shown, for connection in the conventional manner by means of nuts in a hole in the box wall 27. For further disclosure the sleeve member of FIGURE 2 is shown in FIGURE 3 rotated 90° about its longitudinal axis.

FIGURES 4 and 5 disclose another type of termination for cable armor in accordance with the present invention. The armored cable is designated generally by the reference number 28. In terminating this cable the cable conductors are connected to contact blades 29 and while supported in a suitable die the connections and the end of the armored cable are enclosed within a molded mass 30 of rubber or other insulating material in much the same manner that plugs are molded on the ends of electric cords.

Turning now to FIGURES 6 to 12, it will be observed as has been previously alluded to in FIGURE 6, two hangers or supports 31 and 32 support the completed cable, or duct 33 for the cable to be drawn into.

FIGURE 7 shows in some detail the hanger or support 31 with a yoke 33a which is more or less free to move on the supporting portion, and which permits the hanger or support to take a more normal position having regard to the amount of slack.

FIGURE 8 shows in elevation, partly cut away, the attachment of the cable or duct to a wall 34 by fasteners 35 extending through the flanged end 36 of a bracket 38 which fits over the ribbon-like members 12 and 13, and which is attached to the edge portions 14 and 15 by fastening means such as bolts 40. FIGURE 9 is merely a cross section of the construction shown in FIGURE 8.

It has been previously mentioned in this specification that the arched straps constituting a part of the armor or duct are convex on the inside and correspondingly concave on the outside.

FIGURE 11 is intended to set forth a more or less schematic showing of upper and lower racks to which the armored cable is attached. Also shown in this figure is a suitable attachment for mounting the unfilled conduit 33.

This figure as shown at the left represents a duct or conduit 33 through which insulated wire may be drawn, while the midpoint of this figure shows a short section of conduit through which three conductors 43 have been drawn. The right hand part of FIGURE 11 shows a way to obtain the advantages of the invention when making a right angle bend in the conduit in the direction in which it is more flexible than in any other.

FIGURE 12 shows a special form of fasteners 45 to hold the finished product in appropriate fashion with the fins or ribbons in a vertical plane. The fasteners 45 are connected to the supports 47 by fastening means, such as bolts 49.

Cable made according to the present invention may be installed simply by being suspended at spaced intervals of up to 10 feet or more. Because of the relative inflexibility of the cable in one plane it is possible to dispense with the unsightly and expensive troughs, trays and racks heretofore used for supporting universally flexible armored cables.

The present invention may be variously modified and embodied within the scope of the subjoined claims.

This application is a continuation in part of my co-pending application Serial No. 678,179, filed August 14, 1957, now abandoned.

I claim:

1. In an electrical distribution system, a conduit comprising two similar elongated ribbon-like members, each having substantially co-planar longitudinally-extending edge portions which are interconnected by longitudinally-spaced crossbands substantially uniformly located along the length of the edge portions, the crossbands of each member being bowed outwardly in a common direction from the plane of the edge portions and being also curved in the direction of the length of the conduit and in a direction to give each of the crossbands a convex curvature in its inside surface to prevent insulation, splices or other parts of an electrical conductor from catching on the edges of the crossbands when an electrical conductor is pulled through the conduit and across said bands, and the different members being bowed in opposite directions from one another to enclose a substantially cylindrical space through which electrical conductors can be pulled, the edge portions of said members being connected together but being flexible enough when connected to the conduit to be bent in one plane to desired paths in a structure where the conduit is used, the edge portions being stiff in the directions of their planar extent to prevent bending of the conduit in the plane of said edge portions, said conduit having open ends, and at least one electrical conductor within the conduit and extending lengthwise thereof.

2. The electrical distribution system described in claim 1 and in which the inside surface of each of the crossbands is of substantially semi-circular contour, and the crossbands are of one-piece construction with the edge portions that they connect.

3. The electrical distribution system described in claim 1 and in which the successive bands are spaced close enough to bring the edges of successive crossbands into contact with one another along the inside of a curve of the conduit to limit the radius of curvature to which the conduit can be freely flexed and to provide a substantially continuous surface of the conduit and across which conductors are pulled around such a curve of the conduit.

References Cited in the file of this patent

UNITED STATES PATENTS

| | | |
|---|---|---|
| 817,058 | Greenfield | Apr. 3, 1906 |
| 1,683,023 | Champion | Sept. 4, 1928 |
| 1,787,106 | Glazener | Dec. 30, 1930 |
| 2,572,448 | Child | Oct. 23, 1951 |
| 2,748,804 | Guarnaschelli | June 5, 1956 |
| 2,913,515 | Ebel et al. | Nov. 17, 1959 |

FOREIGN PATENTS

| | | |
|---|---|---|
| 617,577 | Great Britain | Feb. 8, 1949 |
| 699,558 | Great Britain | Nov. 11, 1953 |